US012711741B2

(12) United States Patent
Delp, III et al.

(10) Patent No.: US 12,711,741 B2
(45) Date of Patent: Aug. 18, 2026

(54) METHODS AND APPARATUS FOR INCREMENTAL LEARNING USING STORED FEATURES

(71) Applicant: Eli Lilly and Company, Indianapolis, IN (US)

(72) Inventors: Edward John Delp, III, West Lafayette, IN (US); Jiangpeng He, West Lafayette, IN (US); Fengqing Maggie Zhu, West Lafayette, IN (US)

(73) Assignee: Eli Lilly and Company, Indianapolis, IN (US)

( * ) Notice: Subject to any disclaimer, the term of this patent is extended or adjusted under 35 U.S.C. 154(b) by 395 days.

(21) Appl. No.: 18/262,874

(22) PCT Filed: Feb. 18, 2022

(86) PCT No.: PCT/US2022/017017
§ 371 (c)(1),
(2) Date: Jul. 25, 2023

(87) PCT Pub. No.: WO2022/182593
PCT Pub. Date: Sep. 1, 2022

(65) Prior Publication Data

US 2024/0104898 A1 Mar. 28, 2024

Related U.S. Application Data

(60) Provisional application No. 63/152,368, filed on Feb. 23, 2021.

(51) Int. Cl.

| | |
|---|---|
| ***G06V 10/77*** | (2022.01) |
| ***G06V 10/771*** | (2022.01) |
| ***G06V 10/776*** | (2022.01) |

(52) U.S. Cl.
CPC ........ *G06V 10/771* (2022.01); *G06V 10/7715* (2022.01); *G06V 10/776* (2022.01)

(58) Field of Classification Search
CPC ............. G06V 10/771; G06V 10/7715; G06V 10/776; G06V 10/772; G06V 10/82; G06V 10/809
See application file for complete search history.

(56) References Cited

U.S. PATENT DOCUMENTS

2013/0064441 A1* 3/2013 Kask .................... G06V 10/771 382/133
2020/0193552 A1* 6/2020 Turkelson ............. G06F 18/213
(Continued)

OTHER PUBLICATIONS

Song, Personalized Image Classification by Semantic Embedding and Active Learning, 2020, entropy, 22, 1314, pp. 1-26. (Year: 2020).*
(Continued)

*Primary Examiner* — Kathleen M Broughton
(74) *Attorney, Agent, or Firm* — Arthur Shum

(57) ABSTRACT

Computerized techniques are provided for storing a set of representative features for use with a machine learning process. A first set of training images for a class are accessed and processed, using a feature extraction technique, to determine a set of features for the class. A set of representative features from the set of features for the class is determined using a selection technique. The set of representative features are stored for the class. A second set of images is accessed. The machine learning process is executed, using the stored set of representative features, including executing one or more of: a training phase to train a classifier using the second set of images and at least part of the stored set of representative features; and a testing phase to run the classifier using the second set of images and at least part of the stored set of representative features.

20 Claims, 8 Drawing Sheets

(56) References Cited

U.S. PATENT DOCUMENTS

2020/0364520 A1* 11/2020 Brandes .............. G06F 18/2155
2022/0318621 A1* 10/2022 Gong ........................ G06N 7/01

OTHER PUBLICATIONS

Byeon et al, Simultaneously Removing Noise and Selecting Relevant Features for High Dimensional Noise Data, 2008, 7th International Conference on Machine Learning and Applications, pp. 1-7. (Year: 2008).*
Dai et al, Large Discriminative Structured Set Prediction Modeling with Max-Margin Markov Network for Lossless Image Coding, 2013, IEEE Transactions on Image Processing, pp. 1-15. (Year: 2013).*
Rebuffi et al, iCaRL: Incremental Classifier and Representation Learning, 2017, IEEE Conference on Computer Vision and Pattern Recognition, pp. 1-11. (Year: 2017).*
Iscen et al, Memory-Efficient Incremental Learning Through Feature Adaptation, 2020, arXiv:2004.00713v2, pp. 1-18. (Year: 2020).*
Patent Cooperation Treaty International Search Report of the International Searching Authority pertaining to International Patent Application No. PCT/US2022/017017; International Filing Date: Feb. 18, 2022; Date of Mailing: May 19, 2022.
Patent Cooperation Treaty Written Opinion of the International Searching Authority pertaining to International Patent Application No. PCT/US2022/017017; International Filing Date: Feb. 18, 2022; Date of Mailing: May 19, 2022.
Belouadah, E., et al., "Il2m: Class Incremental Learning With Dual Memory," *Proceedings of the IEEE International Conference on Computer Vision*, pp. 583-592, 2019.
Castro, Francisco M., et al., "End-to-End Incremental Learning," Oct. 6, 2018, *Advances in Biometrics: International Conference, ICB 2007, Seoul, Korea, Aug. 27-29, 2007; Proceedings*; [*Lecture Notes in Computer Science; Lect. Notes Computer*], *Springer, Berlin, Heidelberg*, pp. 241-257.
Cauwenberghs, G., et al., "Incremental and Decremental Support Vector Machine Learning," *Proceedings of the Advances in Neural Information Processing Systems*, pp. 409-415, 2001.
Cortes, C., et al., Support-vector networks. *Machine learning*, 20(3):273-297, 1995.
Devries, T., et al., "Dataset Augmentation in Feature Space," *arXiv preprint arXiv: 1702.05538*, 2017.
Goodfellow, I., et al., "Generative Adversarial Nets," *Proceedings of the Advances in Neural Information Processing Systems*, pp. 2672-2680, 2014.
Guo, Y., et al., "Ms-celeb-1m: A Dataset and Benchmark for Large-Scale Face Recognition," *arXiv preprint arXiv:1607.08221*, 2016.
He, J., et al., "Incremental Learning In Online Scenario," *Proceedings of the IEEE Conference on Computer Vision and Pattern Recognition*, pp. 13926-13935, 2020.
He, K., et al., "Deep Residual Learning for Image Recognition," *Proceedings of the IEEE Conference on Computer Vision and Pattern Recognition*, pp. 770-778, 2016.
Hinton, G.E., et al., Reducing the Dimensionality of Data With Neural Networks. *Science*, pp. 504-507, Jul. 2006.
Hinton, G., et al., Distilling the knowledge in a neural network. *Proceedings of the NIPS Deep Learning and Representation Learning Workshop*, 2015.
Hou, S., et al., "Learning a Unified Classifier Incrementally via Rebalancing," *Proceedings of the IEEE Conference on Computer Vision and Pattern Recognition*, pp. 831-839, 2019.
Kemper, R., et al., "Fearnet: Brain-Inspired Model for Incremental Learning," *arXiv preprint arXiv:1711.10563*, 2017.
Krizhevsky, A., et al., "Learning Multiple Layers of Features From Tiny Images," 2009.
Kuzborskij, I., et al., "From n to n+ 1: Multiclass Transfer Incremental Learning," *Proceedings of the IEEE Conference on Computer Vision and Pattern Recognition*, pp. 3358-3365, 2013.
Li, Z., et al., "Learning Without Forgetting," *IEEE Transactions on Pattern Analysis and Machine Intelligence*, 40(12):2935-2947, 2017.
McCloskey, M., et al., "Catastrophic Interference in Connectionist Networks: The Sequential Learning Problem," *In Psychology of Learning and Motivation*, vol. 24, pp. 109-165. Elsevier, 1989.
Mensink, T., et al., "Distance-Based Image Classification: Generalizing to New Classes at Near-Zero Cost," *IEEE Transactions on Pattern Analysis and Machine Intelligence*, 35(11):2624-2637, 2013.
Mirza, M., et al., "Conditional Generative Adversarial Nets," *arXiv preprint arXiv:1411.1784*, 2014.
Paszke, A., et al., "Automatic Differentiation in PyTorch," *Proceedings of the Advances Neural Information Processing Systems Workshop*, 2017.
Polikar, R., et al., "Learn++: An Incremental Learning Algorithm for Supervised Neural Networks," *IEEE Transactions on Systems, Man, and Cybernetics*, 31(4):497-508, 2001.
Rajasegaran, J., et al., "An Adaptive Random Path Selection Approach for Incremental Learning," *arXiv preprint arXiv:1906.01120*, 2019.
Rebuffi, S., et al., "iCaRL Incremental Classifier and Representation Learning," arxiv.org, Cornell University Library, 201 Olin Library Cornell University, Ithaca, NY 14853, Nov. 23, 2016.
Robins, A., "Catastrophic Forgetting, Rehearsal and Pseudorehearsal," *Connection Science*, 7(2):123-146, 1995.
Ruping, S., "Incremental Learning With Support Vector Machines," *Proceedings of the IEEE International Conference on Data Mining*, pp. 641-642, 2001.
Russakovsky, O., et al., "ImageNet Large Scale Visual Recognition Challenge," *International Journal of Computer Vision*, 115(3):211-252, 2015.
Shin, H., et al., "Continual Learning with Deep Generative Replay," *Proceedings of the Advances in Neural Information Processing Systems*, pp. 2990-2999, 2017.
Specht, D., et al., "Probabilistic Neural Networks," Neural Networks, Elsevier Science Publishers, Barking, GB, vol. 3, No. 1, Jan. 1, 1990, pp. 109-118.
Venkatesan, R., et al., "A Strategy for an Uncompromising Incremental Learner," *arXiv preprint arXiv:1705.00744*, 2017.
Welling, M., "Herding Dynamical Weights to Learn," *Proceedings of the International Conference on Machine Learning*, pp. 1121-1128, 2009.
Wu, Y., et al., "Large Scale Incremental Learning," Proceedings of the IEEE Conference on Computer Vision and Pattern Recognition, pp. 374-382, 2019.
Xiang, Y., et al., "Incremental Learning Using Conditional Adversarial Networks," *Proceedings of the IEEE International Conference on Computer Vision*, pp. 6619-6628, 2019.

* cited by examiner

METHODS AND APPARATUS FOR INCREMENTAL LEARNING USING STORED FEATURES

BACKGROUND

Machine learning techniques, such as deep learning techniques, can be used to classify objects in images. Class-incremental learning is a type of continual learning that incrementally trains a machine learning model with new classes over time (e.g., when the new class(es) become available) to build the classifier model. However, incrementally learning new classes can result in catastrophic forgetting, in which the model essentially loses (or forgets) already learned knowledge from older classes due to the unavailability of the old class training data.

SUMMARY

The present disclosure relates to incremental learning techniques that store representative features of classes learned in previous training steps for use with (a) new training steps and/or (b) when executing the classifier.

In one embodiment, a computerized method is provided for storing a set of representative features for use with a machine learning process. The method includes accessing a first set of training images for a class, processing the first set of training images, using a feature extraction technique, to determine a set of features for the class, determining, using a selection technique, a set of representative features from the set of features for the class, storing the set of representative features for the class, accessing a second set of images, and executing, using the stored set of representative features, the machine learning process. Executing the machine learning process includes executing one or more of a training phase to train a classifier using the second set of images and at least part of the stored set of representative features, and a testing phase to run the classifier using the second set of images and at least part of the stored set of representative features.

BRIEF DESCRIPTION OF THE DRAWINGS

Additional embodiments of the disclosure, as well as features and advantages thereof, will become more apparent by reference to the description herein taken in conjunction with the accompanying drawings. The components in the figures are not necessarily to scale. Moreover, in the figures, like-referenced numerals designate corresponding parts throughout the different views.

DETAILED DESCRIPTION

Figure 1:
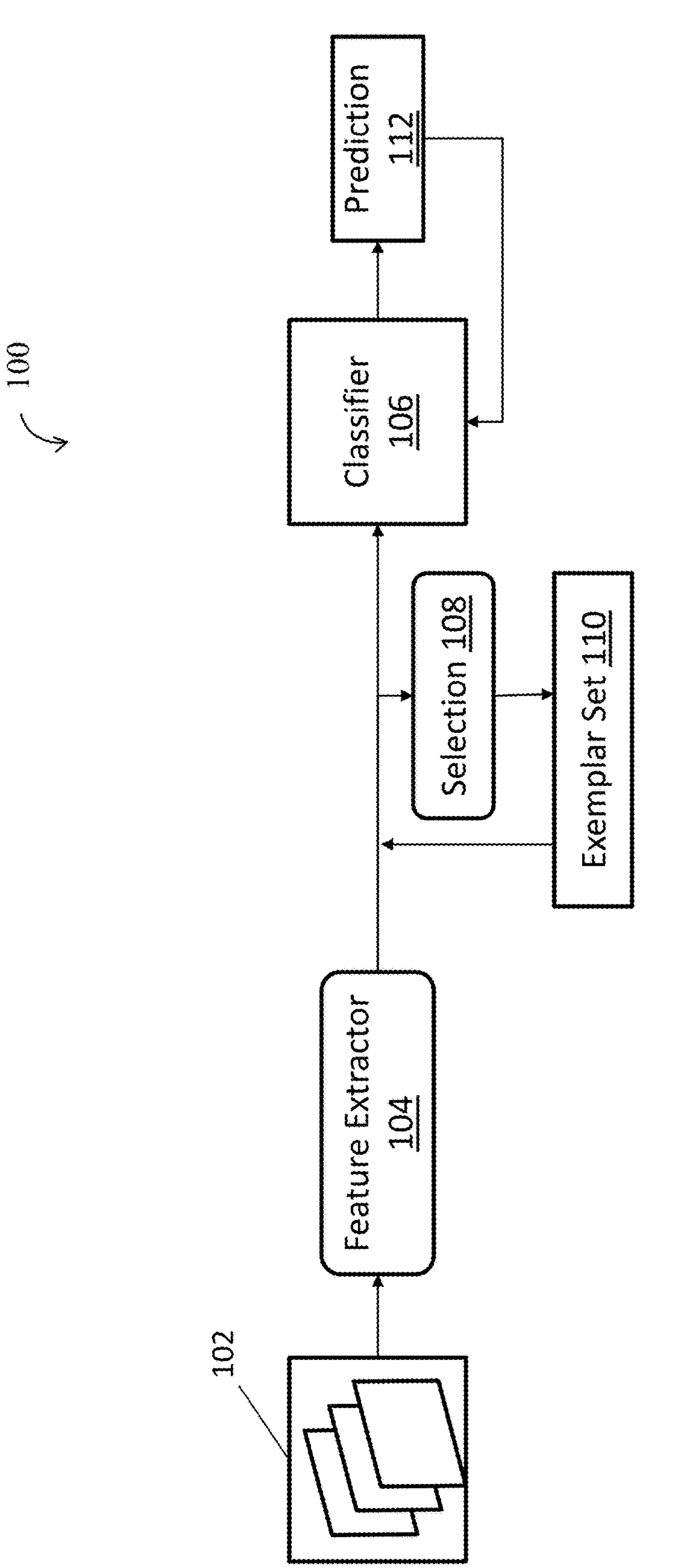
FIG. 1 is a diagram showing an exemplary high level training architecture, according to some embodiments.

For the purposes of promoting an understanding of the principles of the present disclosure, reference will now be made to the embodiments illustrated in the drawings, and specific language will be used to describe the same. It will nevertheless be understood that no limitation of the scope of the invention is thereby intended.

The present disclosure relates to incremental machine learning techniques. Incrementally training a machine learning model to learn new classes can cause the model to lose (or forget) previously trained knowledge due to the unavailability of training data for previously trained classes. Some conventional incremental learning techniques attempt to address such problems by envisioning an ideal scenario (e.g., sometimes referred to as an offline scenario) where new class data is available all at once before each incremental learning step. However, such techniques require training for many epochs. Further, such an ideal scenario is rarely possible for real world applications, where new class data typically becomes available over time (rather than all at once). In particular, for online learning scenarios, since new class data for each incremental learning step becomes available sequentially, it is desirable to train on class data as it is available such that it is not required to wait until all data has arrived to train and/or update the model. As a result, during online learning a model needs to be updated with new class data, sometimes with a limited amount of available training data used for prior steps. Some conventional incremental learning techniques store previously used training data for classes so that the original training data can be used with new class data. However, storing original data can result in large memory footprints as the number of new classes increases. Additionally, or alternatively, for some applications (e.g., health or medical research), long-term storage of original data may not be feasible.

The techniques described herein provide for class-incremental learning using stored representative features that are determined based on the feature data that is input to the network during training (e.g., features extracted using a feature extractor). The stored representative features can provide for incremental learning from sequential data in online scenarios while preserving knowledge learned from prior class data. The extracted representative features can be stored in an exemplar set that can be used to train and/or execute the classifier. In some embodiments, stored representative feature data can be used while incrementally training the classifier. The techniques can include using feature space data augmentation techniques (e.g., random perturbation and/or extrapolation) to modify and/or generate modified representative features that can be used for training. In some embodiments, the techniques provide for using a mixture of stored feature embeddings from the exemplar set and modified features for training. In some embodiments, the extracted feature data can be used during model execution. The stored features in the exemplar set can be used in combination with the classifier output to determine the ultimate output of the model, which can improve model performance. In some embodiments, a machine learning model, such as a probabilistic neural network, can be run based on the representative features stored in the exemplar set to generate information that indicates which incremental step the input data likely belongs to. Such information can be incorporated with the classifier output to determine the final output.

Leveraging extracted features in the exemplar set can be discriminative, memory efficient, and/or privacy preserving. The techniques can outperform conventional approaches in challenging online learning scenarios, including with a larger margin for a smaller incremental step size (e.g., the number of classes added for each step) compared to conventional techniques. In fact, as explained below, the techniques were implemented in an online learning configuration and outperformed conventional techniques implemented using offline learning configurations. As a result, the techniques have been tested to demonstrate that using a mixture of stored feature embeddings from the exemplar set and modified feature embeddings can better address catastrophic forgetting in an online scenario (where new class data is processed sequentially) compared to conventional techniques. The inventors have further appreciated that repeated training of new class data with many epochs, e.g., as is done with conventional offline approaches, can contribute to a model being biased towards new data (and therefore away from older trainings). In some embodiments, the techniques provide for using each set of new class data only once during the incremental learning process to update the model (e.g., and storing representative features for subsequent use), which can further reduce model bias towards new class data.

In some aspects, a set of representative features is generated for use with a machine learning process. A first set of training images can be processed using a feature extraction technique to determine a set of features for the class (e.g., which can be used for training the classifier for the associated incremental training step for that class). The technique include determining, using a selection technique (e.g., Herding selection), a set of representative features from the set of features for the class, and storing the set of representative features for the class (e.g., in an exemplar set). The techniques can include accessing a second set of images and executing, using the stored set of representative features, the machine learning process. Executing the machine learning process can include executing one or more of a training phase to train a classifier using the second set of images and at least part of the stored set of representative features and/or a testing phase to run the classifier using the second set of images and at least part of the stored set of representative features.

In some embodiments, the training phase can combine extracted feature(s) of newly-input class training data with feature(s) from old classes stored in the exemplar set to train the classifier using classification loss. FIG. 1 is a diagram showing an exemplary high level training architecture 100, according to some embodiments. The training architecture 100 includes set(s) of images 102 that are provided for each new class. As a result, the components of the training architecture 100 can be run iteratively for each received set of class training data. The training architecture 100 also includes a feature extractor 104 (e.g., an extraction network, as described herein) that extracts features for the class(es) of the training data 102, which are provided to both the classifier 106 to train the classifier 106 and the selection process 108 to generate an exemplar set of features 110. The classifier 106 generates a prediction 112 that is used to train the classifier 106 using classification loss.

Figure 2:
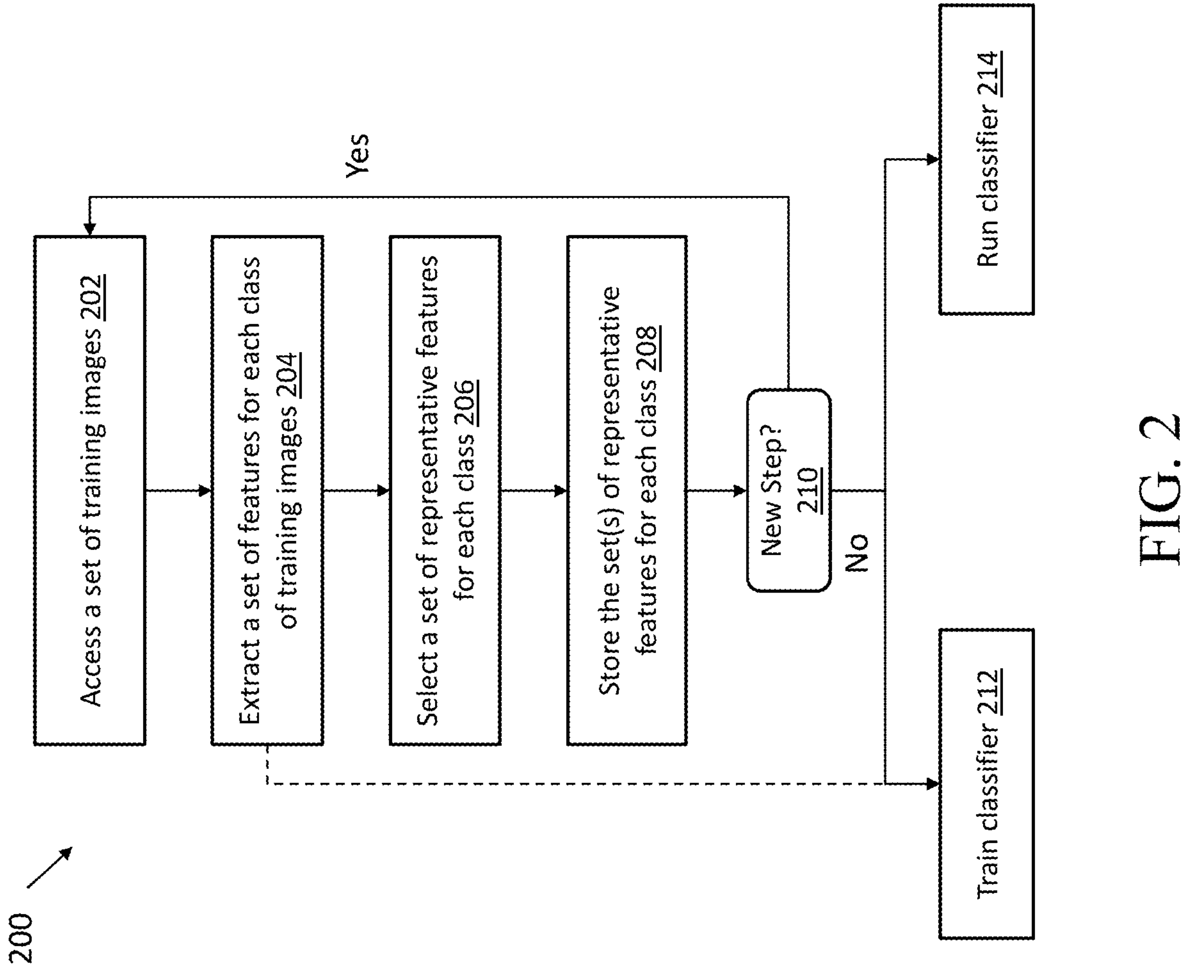
FIG. 2 shows an exemplary computerized method for generating an exemplar set of representative features, according to some embodiments.

The training architecture 100 builds the exemplar set 110 to include representative features that are extracted by the feature extractor 104, which can be used for machine learning processes (e.g., including training and testing). The exemplar set 110 can be generated iteratively as each new set of training data 102 is provided to the system (e.g., in an online scenario). FIG. 2 shows an exemplary computerized method 200 for generating an exemplar set of representative features, according to some embodiments. To illustrate the flow of the training architecture 100 of FIG. 1, the functionality and operation of the training architecture 100 will be described in conjunction with the method 200 of FIG. 2. At step 202 of method 200, the computing device executing the training architecture 100 accesses a first set of training images 102 for a class. In some embodiments, the set of training images 102 can include training images for one class. In some embodiments, the set of training images 102 can include training images for a plurality of classes.

At step 204, the feature extractor 104 processes the set of training images 102 using a feature extraction technique to determine a set of features for each of the class(es) associated with the training data. For example, in some embodiments the feature embeddings of the original data can be extracted by an extraction network, such as a fixed backbone network. The fixed backbone network can be any deep model, and can be pretrained on large-scale datasets.

At step 206, the selection process 108 determines, using a selection technique, a set of representative features from the set of features for each class. The selection technique can be, for example, a Herding selection technique that selects representative features based on class mean. As a general matter, for a given set of input vectors, Herding selection can select representatives of the set of input vectors. In some embodiments, Herding selection can calculate the mean vector of the set and measure the distance of each input vector to the mean vector to determine the representative features. The vectors with the smaller distances are closer to the class mean, and thus can be more representative than those with larger distances. According to some embodiments, the techniques can implement the Herding selection using three steps. First, the computing device can calculate the mean feature vector for each class. Second, within each class, the computing device can calculate the L-2 distance between each feature vector and mean feature vector. Third, the computing device can select the first N features that have the minimum L-2 distance and store them in exemplar set. Therefore, the exemplar set can have N features for each class. The Herding selection process can be implemented as described in Max Welling, "Herding Dynamical Weights to Learn," Proceedings of the $26^{th}$ Annual International Conference on Machine Learning (2009), pp. 1121-1128, which is hereby incorporated by reference in its entirety.

At step 208, the computing device stores the set of representative features for the class determined at step 206 in the exemplar set 110. At step 210, the computing device 200 iteratively builds the set of representative features during the training process by repeating steps 202-208 for each new set of training images 102. For example, for a new iteration of the process 200, the computing device accesses a new set of training images 102 for a new class at step 202, uses the feature extractor 104 to extract a set of features for the new class at step 204, uses the selection process 108 to select a set of representative features for the new class at step 206, and adds the selected set to the exemplar set 110.

As explained herein, the exemplar set 110 can be used to train the classifier 106 and/or to run the classifier 106. After generating a desired amount of representative features for the exemplar set 110, the method 200 can proceed from step 210 to either step 212 to train the classifier 106 using the exemplar set 110 and/or to step 214 to run the classifier 106 using the exemplar set 110.

Figure 3:
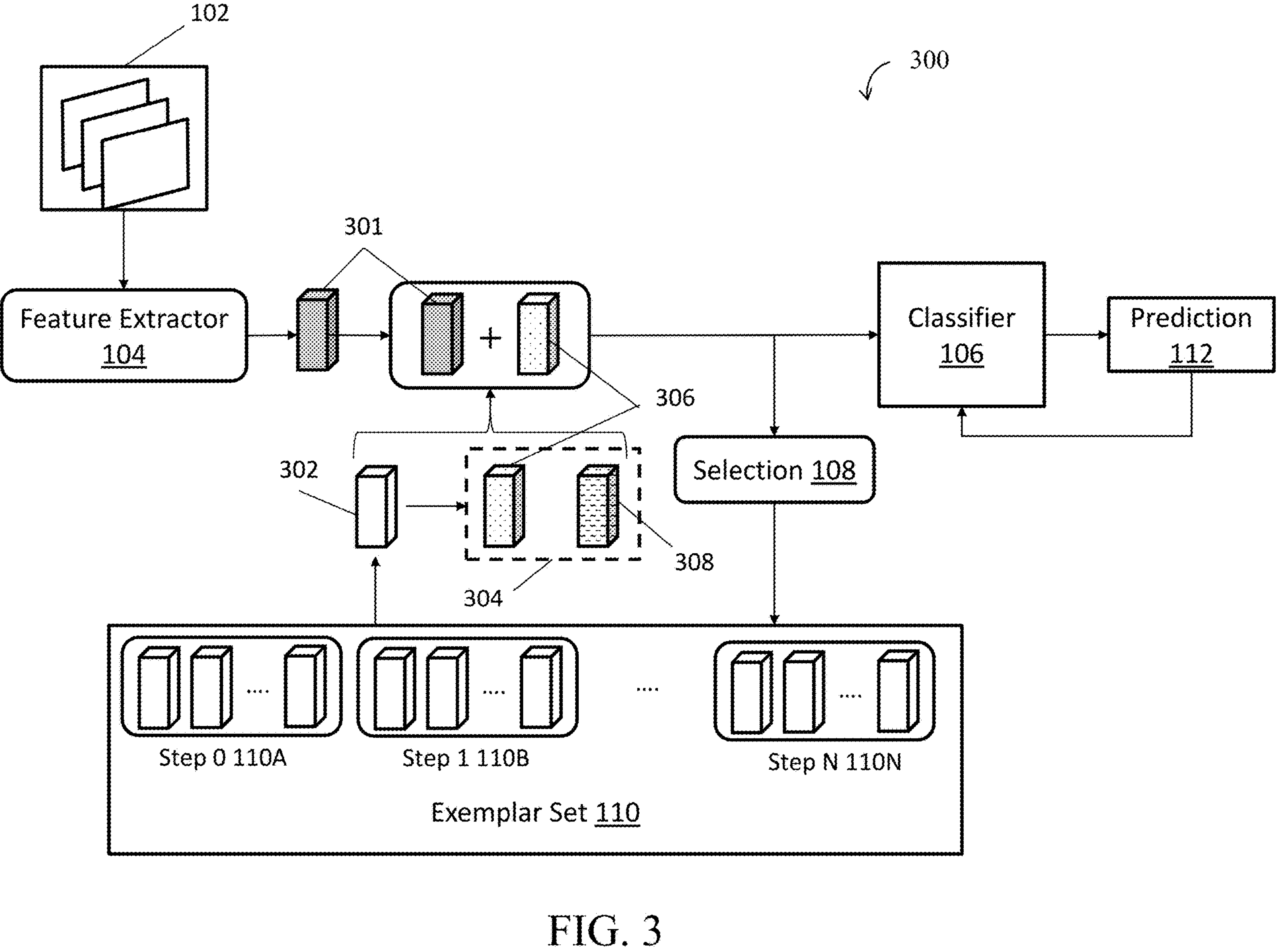
FIG. 3 is a diagram illustrating the use of the training architecture of FIG. 1 for training a classifier, according to some embodiments.

Referring to step 212, FIG. 3 is a diagram 300 illustrating the use of the training architecture 100 for training the classifier 106, according to some embodiments. The diagram 300 includes aspects of the training architecture 100 in FIG. 1, including the feature extractor 104 (which receives the input images 102), the classifier 106, the selection process 108, the exemplar set 110, and the determined prediction 112. In some embodiments, cross-entropy can be used as the loss function. As also shown in FIG. 3, the exemplar set 110 includes exemplary features 110A for the first step (step 0) of building the exemplar set 110, exemplary features 110B for the second step (step 1) of building the exemplar set 110, and so on through exemplary features 110N for the $n^{th}$ step. As discussed in conjunction with FIG. 2, for example, in some embodiments each step of building the exemplar set 110 can include performing steps 202-208 of method 200.

Figure 4:
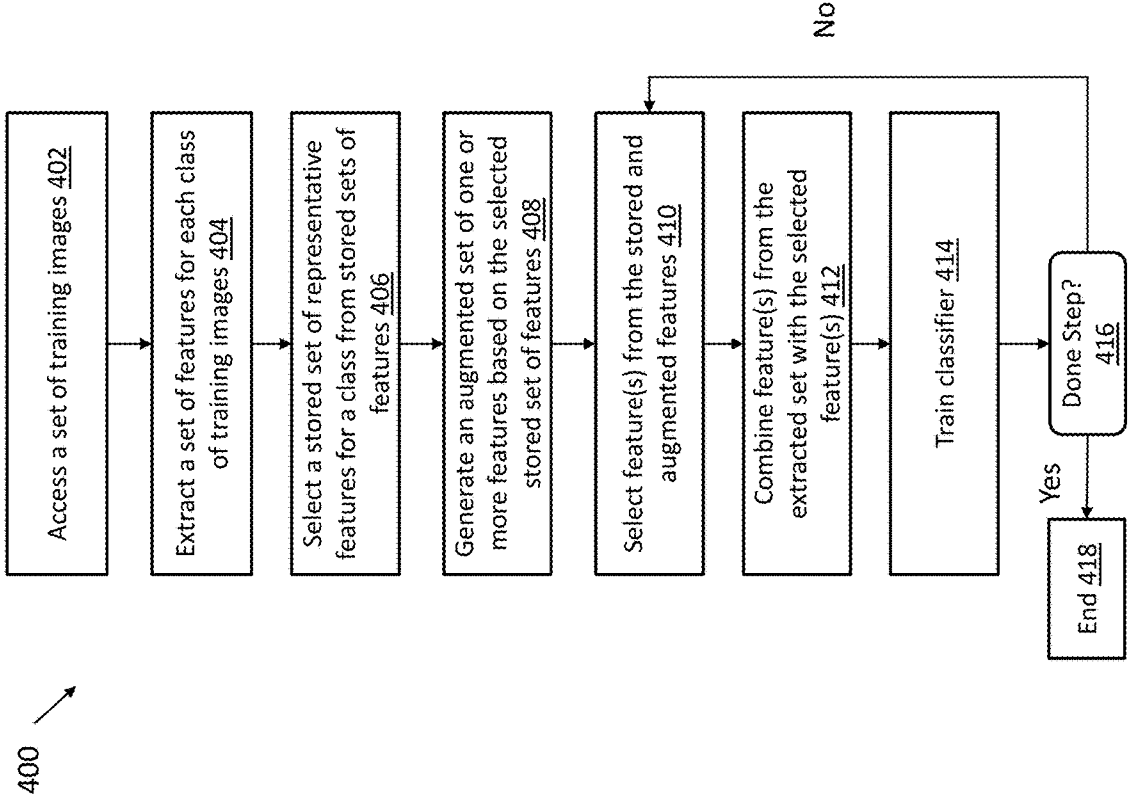
FIG. 4 is a diagram of an exemplary computerized method for training a classifier, according to some embodiments.

For illustrative purposes, FIG. 3 will be described in conjunction with FIG. 4. FIG. 4 is a diagram of an exemplary computerized method 400 for training a classifier, according to some embodiments. At step 402, the computing device accesses a set of training images 102. At step 404, the computing device extracts a set of features 301 for each class of the training images 102 (e.g., using a selection process, such as Herding selection). At step 406, the computing device selects one or more representative features for a class in the exemplar set 110. In the example shown in FIG. 3, for example, the computing device selects representative feature 302.

In some embodiments, the techniques can include using a combination of the extracted features in the representative set and augmented features (e.g., features generated based on the features in the representative set using data augmentation techniques) to retain learned knowledge. At step 408, the computing device generates a set of one or more augmented features 304 based on the representative feature 302 selected at step 406. In some embodiments, as shown in FIG. 3, the computing device can generate a plurality of augmented features in the set 304, which includes a first modified representative feature 306 and a second modified representative feature 308.

The techniques described herein use data augmentation techniques to generate the modified representative features. In particular, the inventors have appreciated that data augmentation techniques can be well-suited for online scenarios, e.g. compared to other techniques like generative models, which typically require lengthy offline training and therefore are not practical to use in online scenarios. Therefore, the techniques can include applying data augmentation and using the augmented or modified representative features along with the stored representative features in the exemplar set to perform training in an online scenario in a manner that maintains already learned knowledge during incremental learning.

Since conventional data augmentation techniques that are typically applied to image data (e.g., rotations, flips, random crops, etc.) cannot be used directly in the feature space, the data augmentation techniques used to generate the modified features in the set 304 can include random perturbation and/or extrapolation. In some embodiments, for example, the computing device can add a perturbation to the selected representative feature 302 to generate the first modified representative feature 306. In some embodiments, the computing device can determining a noise component (e.g., a random vector) for the representative feature 302, and use the noise component to generate the first modified representative feature 306 (e.g., such that the first modified representative feature 306 is a new exemplar with perturbation). For example, a random vector P can be added to an original representative feature. The vector P can be determined by drawing from a Gaussian distribution with zero mean and per-element standard deviation as shown in Equation 1:

$$\tilde{x}_i = x_i + \epsilon P,\ P \sim N(0, \sigma_i) \qquad \text{Equation 1}$$

Where:

i indexes the exemplars, $x_i$ refers to the stored feature in the exemplar set, $\tilde{x}_i$ denotes the corresponding generated pseudo feature embedding, and $\epsilon$ is a constant controls the scale of noise (e.g., which can be set to $\epsilon=1$).

In some embodiments, the computing device can determine a second modified representative feature 308. For example the computing device can select another representative feature (e.g., from the same class from which representative feature 302 was selected) and use that second representative feature to determine a second modified representative feature 308. In some embodiments, the computing device can perform an extrapolation process to determine the second modified representative feature 308. For example, the computing device can determine the second modified representative feature 308 based on a difference between values of the first representative feature 302 and the selected representative feature. As a general example, the difference between two representative features $x_i$ and $x_j$, which can be randomly drawn from the same class, can be added back to $x_i$. For example, the following Equation 2 can be used to determine a modified representative feature:

$$\tilde{x}_i = (x_i - x_j) \times \lambda + x_i \qquad \text{Equation 2}$$

Where:

$\lambda$ is a scalar to control the degree of the augmentation and in the case of extrapolation, $\lambda \in (0, \infty)$.

As an example, assume the computing device has selected representative feature 302 (e.g., used to generate the first modified representative feature 306) as $x_i$ and a second representative feature as $x_j$, which can be randomly selected from the same class of the exemplar set (e.g., from the class associated with step 1 110B). The computing device can compute the difference between $x_i$ and $x_j$ to determine the second modified representative feature 308 as $\tilde{x}_i$. For example, the computing device can multiply the difference by a parameter lambda ($\lambda$) as shown in Equation 2, and add the result back to $x_i$ to generate $\tilde{x}_i$. The smaller lambda is, then the closer the second modified representative feature 308 will be to the first modified representative feature 306. On the other hand, the larger lambda is, the more that the second modified representative feature 308 will differ from the first modified representative feature 306 (e.g., and therefore may not belong to the same class from which the representative features were originally selected). Therefore, a lambda value of 0.25, 0.5, 0.75, and/or the like can be used in order for the second modified representative feature 308 to be sufficiently different but still belong to the same class. For example, a value of 0.5 can be used in order for the generated modified representative feature to balance the properties of the selected representative features $x_i$ and $x_j$.

At step 410, the computing device selects at least one of an unmodified representative feature from the exemplar set 110 or one of the modified features in the modified set 304. In the example shown in FIG. 3, the computing device selects the first modified representative feature 306 from among the representative feature 302, the first modified representative feature 306, and the second modified representative feature 308.

At step 412, the computing device combines the feature(s) selected from step 410, namely the first modified representative feature 306, with the extracted features 301. At step 414, the computing device executes a training phase to train the classifier 106 using the first modified representative feature 306 and the extracted features 301. As shown in FIG. 4, if not finished with training, the computing device can iteratively perform steps 410-414 to further train the classifier 106. Otherwise, the method 400 proceeds to step 418 and ends.

Therefore, as described herein a feature extractor 104 can obtain representative features for each set of new training data 102 that is used to train the classifier 106. For each step of the training phase for each new class data, the techniques can randomly select an exemplar representative feature 302 and apply feature space data augmentation to obtain modified representative features 306 and 308. For training, the extracted features of the new training data 301 is combined with one randomly selected feature from among features 302, 306 and 308 to train the classifier using classification loss. The computing device also stores representative features for the newly extracted features 301 to further build the exemplar set 110.

Referring back to step 214 of FIG. 2, the exemplar set can also be used to execute the classifier. In some embodiments, the techniques can include using features from the exemplar set to determine the final prediction when running and/or testing the classifier. While catastrophic forgetting can be caused by the bias of the parameters towards new classes due to the lack of old data for previously trained classes, the model can still remain discriminative to provide a correct prediction within the classifier for each incremental step. Therefore, some aspects of the techniques described herein provide for leveraging the stored feature embeddings in the exemplar set during model execution. In some embodiments, the techniques include determining or predicting which incremental step the input data likely belongs to based on the exemplar set, and incorporating such prediction information into the output of the classifier to determine the final output.

Figure 5:
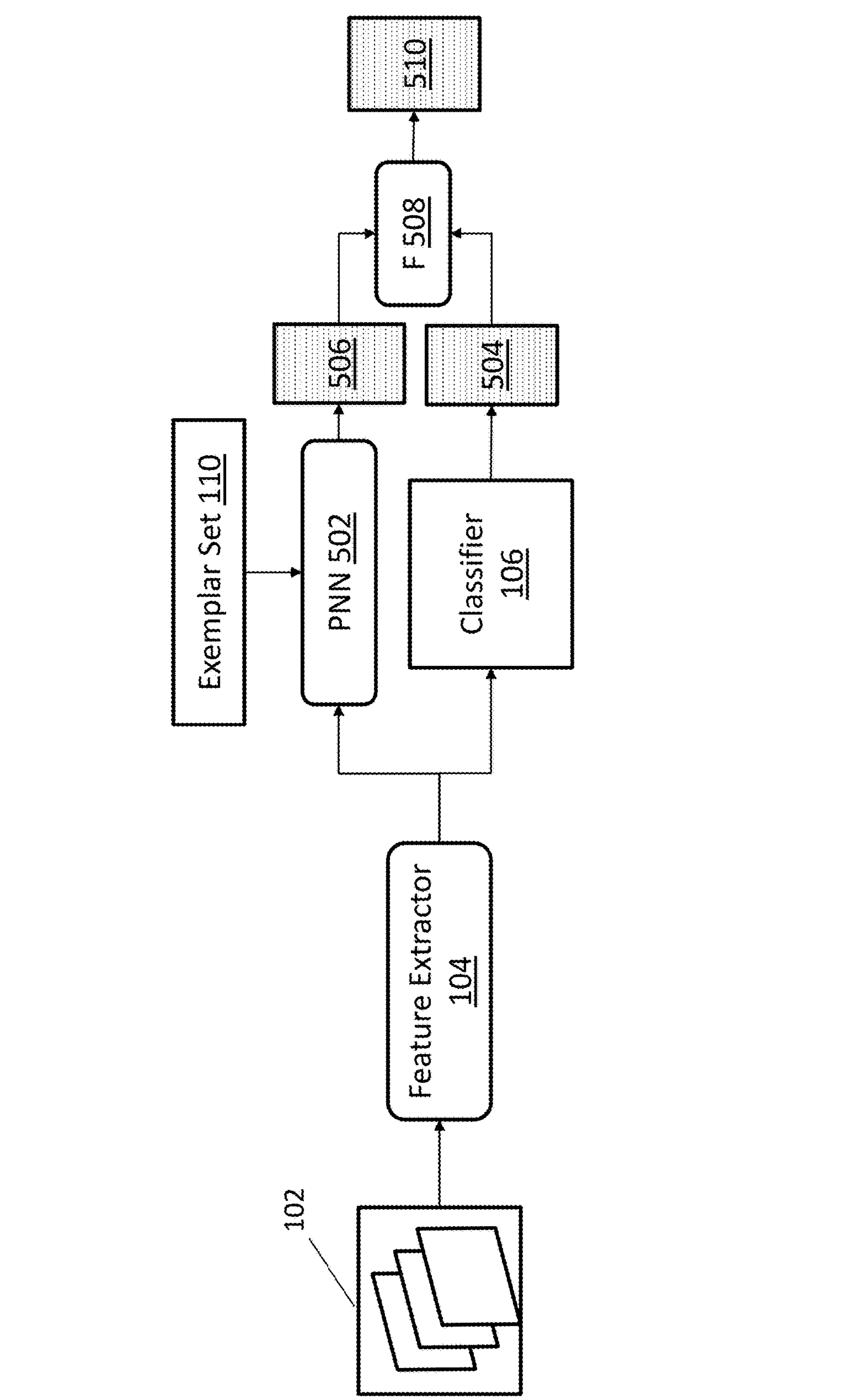
FIG. 5 is a diagram of an execution architecture that includes aspects of the architecture of FIG. 1 for running a classifier, according to some embodiments.

FIG. 5 is a diagram of an execution architecture 500 for running the classifier 106 from FIG. 1 using the exemplar set 110, according to some embodiments. The execution architecture 500 includes aspects of the training architecture 100 in FIG. 1, including the feature extractor 104 (which receives the input images 102), the classifier 106, the selection process 108, and the exemplar set 110. FIG. 5 also shows a second machine learning model, which in this example is a PNN classifier 502.

Figure 6:
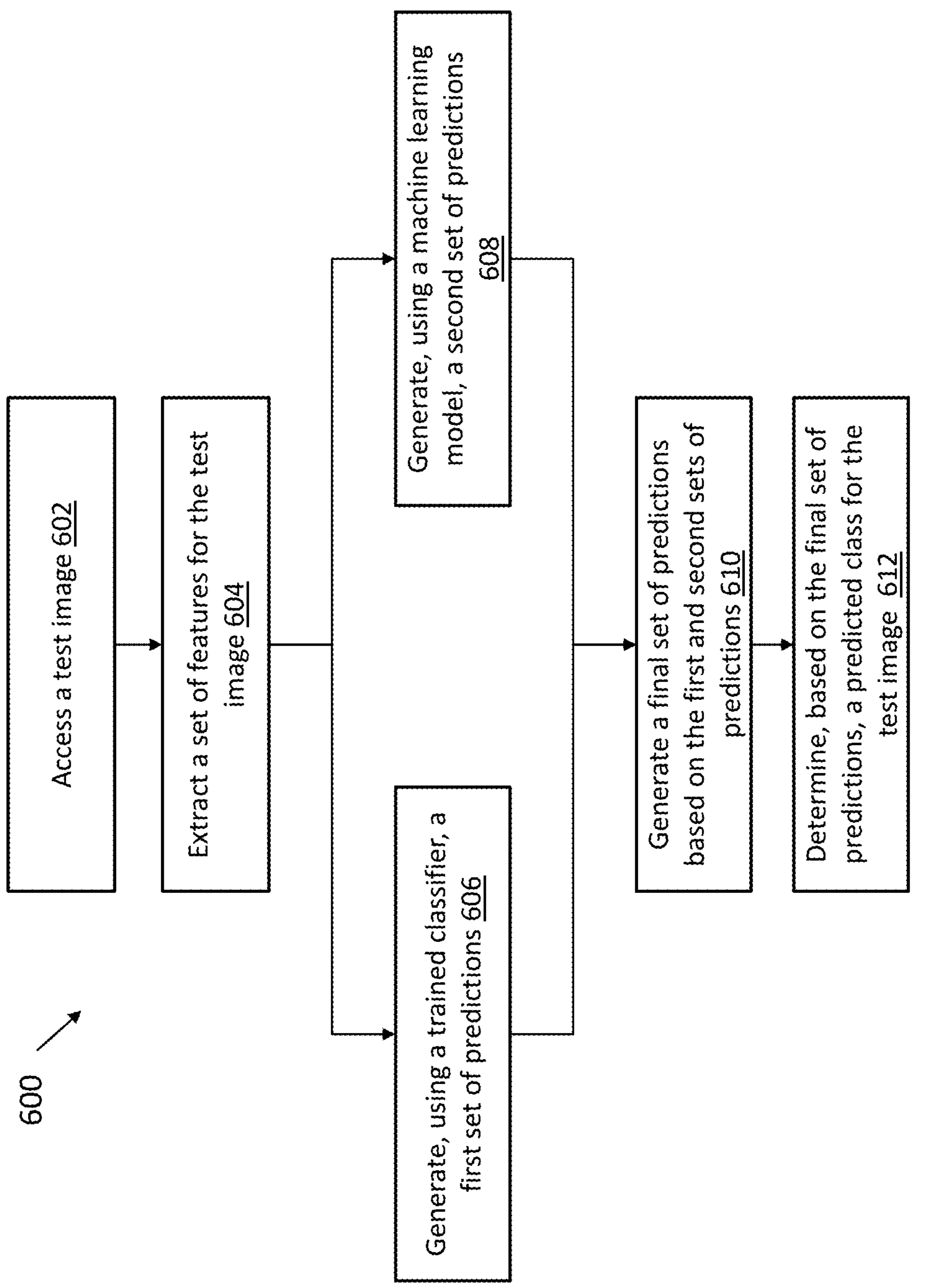
FIG. 6 is a diagram of an exemplary computerized method for executing a classifier, according to some embodiments.

FIG. 5 will be further described in conjunction with FIG. 6, which is a diagram of an exemplary computerized method 600 for executing a classifier using an exemplar set, according to some embodiments. At step 602, the computing device accesses a test image 102 (e.g., a new image to classify using the classifier 106). At step 604, the computing device runs the feature extractor 104 to extract feature(s) for the test image 102. The computing device then executes both the classifier 106 and the PNN 502. At step 606, the computing device generates, using the classifier 106, a first set of predictions 504. At step 608, the computing device generates, using the PNN 502, a second set of predictions 506. At step 610, the computing device executes a function 508 to determine a final set of predictions 510 based on the first set of predictions 504 and the second set of predictions 506. At step 612, the computing device determines a predicted class for the new image 102 based on the final set of predictions 510. For example, the computing device can select a top predicted class in the final set of predictions 510 to be the final predicted class for the image 102.

Figure 7:
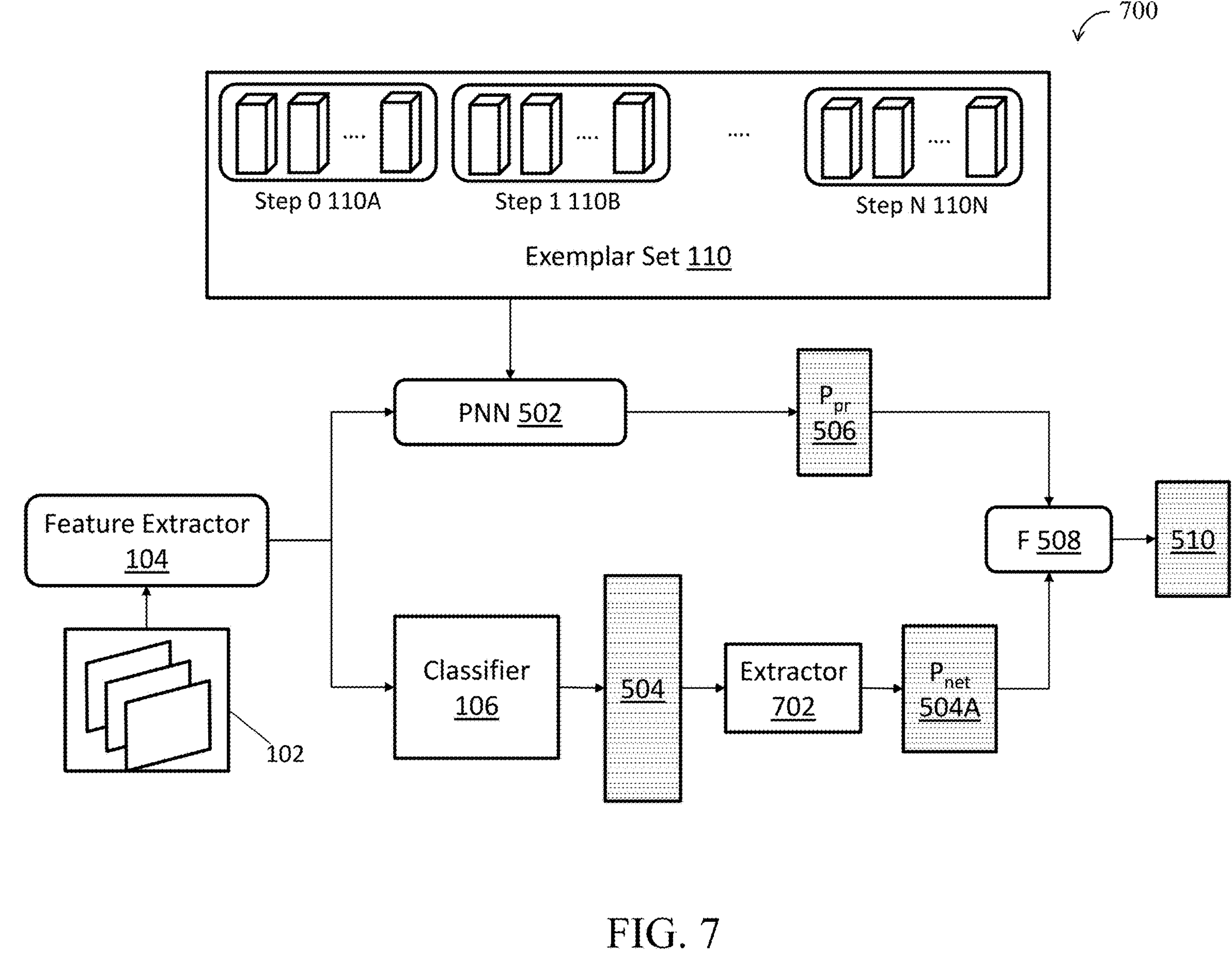
FIG. 7 is a diagram of using an exemplar set with features for classes from incremental training steps to execute a classifier, according to some embodiments.

As described herein, the exemplar set 110 can include a plurality of sets of features. FIG. 7 is a diagram 700 of the detailed exemplar set 110 with features for classes from step 0 110A, step 1 110B, through step N 110N as discussed in conjunction with FIG. 3. In some embodiments, the classifier 106 may generate a plurality of predictions in the first set of predictions 504, and the PNN 502 may generate a plurality of predictions in the second set of predictions 506. The predictions can be based on, for example, the classes in the exemplar set 110, the classes from steps 0 110A through step N 110N in the exemplar set 110, and/or the like. For example, the computing device can run the classifier 106 to generate the first set of predictions 504 by generating, for each class 110A through 110N of the exemplar set 110, a value that is indicative of a prediction of whether the features extracted for the new image 102 belongs to the associated class.

It should be appreciated that each step may include the same and/or a different number of classes compared to other training steps, and the classifier can be configured accordingly. Therefore, in some embodiments the number of classes for some training steps may be different, while the number of classes for some training steps may be the same. In some embodiments, one or more classes can be presented in multiple training steps, such that a class of a first training step may be presented in a second training step and/or a plurality of subsequent training steps. For example, as a simple set of training steps to illustrate this point is as follows: step one (1) can train two classes (e.g., cats, dogs), step two (2) can train three classes (e.g., dogs, fish, birds), and step three (3) can train four classes (e.g., airplanes, dogs, cats, cars). In this example, the number of classes presented in each step is different than other training steps, and the "dogs" and "cats" classes appear in more than one training step. In some embodiments, if some classes (e.g., "dogs" and "cats") appear in multiple steps, the techniques may not train the classifier again using the data from already seen classes (e.g., since the classifier has been sufficiently trained for these classes). Therefore, in some embodiments, the model is only trained using new classes as they appear over time in the training steps. For example, continuing with the example above, step 1 can train cats and dogs, step 2 can train fish and birds (such that the dog data is ignored), and step 3 can train airplanes and cars (such that the dog and cat data is ignored).

As an example where the number of classes can be variable across the training steps, the classifier 106 can be a network (e.g., a fully connected network) that maps $R^{D_f} \rightarrow R^{C_f}$, where $C_f$ represents the total number of classes seen in the training steps. In examples where each step includes new classes, such that each step i presents $m_i$ classes for training (or where only new classes are used), and there are N steps, then $$C_f=\sum_{i=1}^{N} m_i.$$

As a further example where the number of classes remains the same for the training steps, the classifier 106 can be a network that maps $R^{Df}\rightarrow R^{M\times(N+1)}$, where $D_f$ is the dimension of extracted feature and M is the step size. The classifier network can be expressed as the integration of (N+1) sub-classifiers corresponding to N incremental steps and 1 for initial classes before the first incremental learning step. Each sub-classifier can have an output vector of dimension M, and the complete network output vector can be of dimension M×(N+1). The complete network output vector can be expressed as $$(O_0^1, \ldots, O_0^M, O_1^1, \ldots, O_1^M, \ldots, O_N^1, \ldots, O_N^M)$$

where $$O_j^s$$

refers to the $s^{th}$ output unit by the sub-classifier for step j.

As another example, the computing device can run the PNN 502 to generate the second set of predictions 506 by generating, for each step that added sets of representative feature(s) for one or more classes to the exemplar set, a value that is indicative of a prediction of whether the extracted features of the new image 102 belongs to the step (e.g., where an input image is considered to belong to a step if it belongs to a class that was presented in that step). Accordingly, the computing device can access the sets of stored representative features 110A through 110N in the exemplar set, and execute the PNN 502 using the sets of stored representative features 110A through 110N to generate the second set of predictions 506 for the new image. The PNN 502 can be used to determine data indicative of which incremental training step the input data belongs to, which can be used to improve overall performance of the final prediction since the incremental classifier 106 model can remain discriminative within each incremental step to produce the correct prediction.

As an illustrative example, let M denote the incremental step size (e.g., the number of classes for each training step). As explained herein, the step size can change across the training steps, and therefore this is for illustrative purposes only. It should be appreciated that the incremental step size can change for each training iteration, however for illustrative purposes the example that follows assumes the step size remains the same for each incremental step. Suppose the size of the exemplar set is q, such that q features are selected for each class and stored in the exemplar set. After each incremental step, in an example where each step only includes new classes, there are M×q new features added to the exemplar set. It should be appreciated that in other examples where some classes appear in multiple steps, q exemplars are added per class when first appearing in a training step. After completing the learning process for the $N^{th}$ incremental step, then the exemplar set contains $$E=\{(v_0^1, v_0^2, \ldots v_0^{M\times q}), \ldots (v_N^1, v_N^2, \ldots v_N^{M\times q})\},$$

where $$v_j^k$$

denotes the $k^{th}$ stored feature in the exemplar set for incremental step j and j=0 indicates the classes learned by the model before the first incremental learning step.

Referring to the PNN 502, in some embodiments the PNN described in Donald F. Specht, "Probabilistic neural networks," Neural networks, 3(1):109-118, 1990, which is incorporated by reference herein in its entirety, can be used to generate the prior probability distribution of which incremental step the input data belongs to. The PNN 502 can compute class conditional probabilities using stored features in the exemplar set. For example, the PNN 502 can calculate the probability that an input feature vector x belongs to incremental step i as formulated in Equation 3:

$$P(i\mid x)=\frac{\alpha_i}{\sum_{j=0}^{N}\alpha_j} \quad \text{Equation 3}$$

$$\alpha_j=(\epsilon+\min_k\|x-v_j^k\|2)^{-1}$$

Where:

$\epsilon>0$ is used for regularization, and $$v_j^k$$

denotes the $k^{th}$ stored feature in exemplar set for incremental step j.

In some embodiments, the output of PNN 502 is a N+1 dimension prior distribution vector $P_{pr}=(p_0, p_1, p_N)$ (as shown in FIG. 7 as $P_{pr}$ 506), where each output unit $p_i$ in the vector $P_{pr}$ refers to the probability distribution that the input data belongs to the corresponding classes in the incremental step i. For example, $p_1$ can refer to the probability that the input data belongs to classes of incremental step 1.

As also shown in FIG. 7, the architecture can include an extractor 702. The extractor 702 can generate a modified set of predictions $P_{net}$ 504A based on the set of predictions 504. The extractor 702 can be used, for example, to adjust the number of predictions in the first set of predictions 504 so that it is equal to the number of predictions in the second set of predictions 506.

As noted above, the output of the classifier can be dimensioned based on the number of classes in the training steps. As a general matter, the output of the classifier 106 can be dimensioned based on the total number of classes observed across the training steps. In some embodiments, where the training process only uses unique classes (e.g., where classes presented in multiple training steps are only used once for training), the output of the classifier 106 can be dimensioned based on the total number of unique classes used across the training steps. As an illustrative example where the number of classes remains the same across the training steps and each step uses unique classes, the output of the classifier 106 can be of dimension M×(N+1), and the output vector can be expressed as $$(O_0^1, \ldots, O_0^M, O_1^1, \ldots, O_1^M, O_N^1, \ldots, O_N^M)$$

where $$O_j^s$$

refers to the $s^{th}$ output unit by the sub-classifier for step j. A dimension reduction can be performed by extracting, for example, the maximum units for each of the (N+1) sub-classifiers to obtain $\{m_0, m_1, \ldots m_n\}$ where $m_j$ refers to the maximum unit for the $j^{th}$ sub-classifier's output $$O_j^1, \ldots, O_j^M).$$

In some embodiments, the extracted output vector can be normalized according to Equation 4 below:

$$\hat{m}_i = \frac{m_i - \min_{k=0}^{N}\{m_k\}}{\epsilon + \sum_{j=0}^{N}\left(m_j - \min_{k=0}^{N}\{m_k\}\right)} \quad \text{Equation 4}$$

where:

$\epsilon$ is used for regularization.

The resulting vector $P_{net}=\{\widehat{m_0}, \widehat{m_1}, \ldots \widehat{m_N},\}$ has the same dimension of N+1 as $P_{pr}$.

In some embodiments, the function 508 can combine the predictions from the classifier (e.g., the first set of predictions 504 and/or 504A) with the predictions from the machine learning model (e.g., the second set of predictions 506) to generate the final set of predictions that are used to classify the image. In some embodiments, the computing device can use a weighting factor that is used to combine predictions for a same class. For example, the computing device can determine a weighting factor (e.g., $e^{(S-1)}$) based on a maximum prediction and a minimum prediction of the predictions generated by the machine learning model. In some embodiments, the weighting factor can be determined based on one or more normalization factors, such as a normalization constant. The computing device can adjust the predictions of the machine learning model based on the weighting factor, and the adjusted predictions to the predictions determined by the classifier to determine the final set of predictions.

As an illustrative example of combining the predictions from the classifier (e.g., the first set of predictions 504 and/or $P_{net}$ 504A) with the predictions from the machine learning model (e.g., the second set of predictions $P_{pr}$ 506), the computing device can be configured to combine the extracted output $P_{net}$ determined using Equation 4 with the prior probability distribution $P_{pr}$ computed by the PNN 502. Exemplary Equation 5 shows a technique for combining the two outputs:

$$\hat{P} = P_{net} + e^{(S-1)} \times P_{pr},\ S = \frac{\max(P_{pr}) - \min(P_{pr})}{\beta} \quad \text{Equation 5}$$

Where:

$e^{(S-1)}$ is the ratio to combine the two vectors; and $\beta \in (0,1)$ is a normalization constant.

Since a higher value of $\max(P_{pr})-\min(P_{pr})$ can indicate a more confident prior probability distribution (e.g., where as described herein each output unit $p_i$ in the vector $P_{pr}$ refers to the probability distribution that the input data belongs to the corresponding classes in the incremental step i), the resulting final output $\hat{P}$ also has a higher value due to $P_{pr}$ and vice versa. β can be estimated by constructing a pilot set containing modified representative features (e.g., determined by adding perturbation and/or performing extrapolation). For example, for each modified representative feature, the computing device can be configured to compute the difference between the maximum and minimum value of the output of PNN and use the mean value as the estimated β.

Exemplary Experimental Results

Exemplary experiments were conducted on the techniques described herein on two public datasets, CIFAR-100 (e.g., described in Alex Krizhevsky et al., "Learning multiple layers of features from tiny images," 2009, which is hereby incorporated by reference herein in its entirety) and ImageNet (e.g., described in Olga Russakovsky et al., "ImageNet Large Scale Visual Recognition Challenge," International Journal of Computer Vision, 115(3):211-252, 2015, which is hereby incorporated by reference herein in its entirety). The classifier was implemented based on Pytorch (e.g., described in Adam Paszke et al., Automatic differentiation in PyTorch," Proceedings of the Advances Neural Information Processing Systems Workshop, 2017, which is hereby incorporated by reference herein in its entirety) and used ResNet-50 that is pre-trained on 100 classes that are randomly selected from the ImageNet datasets as the feature extraction network with extracted features of dimension 2,048. It should be appreciated that while this exemplary experiment was implemented using Pytorch and ResNet-50, the techniques can be implemented using other techniques. The ResNet-50 implementation followed the settings as suggested in Kaiming He et al., "Deep residual learning for image recognition," Proceedings of the IEEE Conference on Computer Vision and Pattern Recognition, pages 770-778, 2016, which is hereby incorporated by reference herein in its entirety. Each new class data was used with a single pass training step to update the model in the online scenario during the training phase.

CIFAR-100 consists of 60K RGB images of 100 common objects in real life. The dataset is originally divided into 50K as training and 10K as testing. For these experiments, the 100 classes were divided into splits of 5, 10, 20, and 50 as step sizes, and therefore resulting in 20, 10, 5, and 2 incremental steps, respectively. For ImageNet, Large-Scale Visual Recognition Challenge 2012 (ILSVRC12) is an annual competition which uses a subset of ImageNet that contains 1,000 classes with more than 1k images per class. In total, there are about 1.2 million training images, 50K validation images, and 150K testing images. For the experiment, 100 classes were randomly selected from ImageNet (that do not overlap with the 100 classes used for pre-training) to construct ImageNet-100, which was divided into 10 classes split to have an incremental step size of 10.

For comparison, the experiments followed the benchmark experimental protocol for class-incremental learning proposed in Sylvestre-Alvise Rebuffi et al., "iCaRL: Incremental classifier and representation learning," Proceedings of the IEEE Conference on Computer Vision and Pattern Recognition, July 2017, which is incorporated by reference herein in its entirety, to select exemplars (20 per class and up to 2,000 exemplars in total) and arrange classes using an identical random seed (1993). The results were compared with conventional techniques, including LwF.MC (e.g., described in Zhizhong Li and Derek Hoiem, "Learning without forgetting," IEEE Transactions on Pattern Analysis and Machine Intelligence, 40(12):2935-2947, 2017, which is incorporated by reference herein in its entirety, and Rebuffi), ICARL (e.g., as described in Rebuffi), EEIL (e.g., as described in Francisco M. Castro et al., "End-to-end incremental learning," Proceedings of the European Conference on Computer Vision, September 2018, which is incorporated by reference herein in its entirety), BIC (e.g., described in Yue Wu et al., "Large scale incremental learning," Proceedings of the IEEE Conference on Computer Vision and Pattern Recognition, June 2019, which is incorporated by reference herein in its entirety), RPS (Jathushan Rajasegaran et al., "An adaptive random path selection approach for incremental learning," arXiv preprint arXiv:1906.01120, 2019, which is incorporated by reference herein in its entirety), MDAFCIL (e.g., described in Bowen Zhao, Xi Xiao, Guojun Gan, Bin Zhang, and Shu-Tao Xia, "Maintaining discrimination and fairness in class incremental learning," Proceedings of the IEEE Conference on Computer Vision and Pattern Recognition, pages 13208-13217, 2020, which is incorporated by reference herein in its entirety) and ILIO (e.g., described in Jiangpeng He et al., "Incremental learning in online scenario," Proceedings of the IEEE Conference on Computer Vision and Pattern Recognition, pages 13926-13935, 2020, which is incorporated by reference herein in its entirety). Among these methods used for evaluation, only the Pytorch/ResNet implementation of the techniques described herein and ILIO were implemented in the more challenging online scenario where data belonging to new classes was randomly shuffled and made available sequentially, while other methods were implemented in the offline scenario where all data from new classes was available before each incremental step. The implementation of the techniques described herein achieved the best results, with the average accuracy on the ImageNet and CIFAR datasets for different step sizes shown in Tables 1-2, below (which gives an overall performance for the entire incremental learning steps, except the first step that is not related to incremental learning):

TABLE 1

| CIFAR-100 | | | | |
|---|---|---|---|---|
| Step size | 5 | 10 | 20 | 50 |
| LwF.MC | 0.297 | 0.397 | 0.471 | 0.526 |
| ICARL | 0.597 | 0.616 | 0.633 | 0.620 |
| EEIL | 0.634 | 0.636 | 0.637 | 0.608 |
| BIC | 0.621 | 0.635 | 0.651 | 0.649 |
| MDAFCIL | 0.626 | 0.645 | 0.666 | 0.651 |
| ILIO | 0.673 | 0.690 | 0.699 | 0.653 |

TABLE 1-continued

| CIFAR-100 | | | | |
|---|---|---|---|---|
| Step size | 5 | 10 | 20 | 50 |
| Exemplary Pytorch/ResNet Implementation | 0.706 | 0.699 | 0.705 | 0.657 |

TABLE 2

| ImageNet-100 | | |
|---|---|---|
| Step size | Last Step | Average |
| LwF.MC | 0.366 | 0.607 |
| ICARL | 0.638 | 0.818 |
| EEIL | 0.802 | 0.892 |
| BIC | 0.844 | 0.898 |
| RPS | 0.740 | 0.866 |
| MDAFCIL | 0.841 | 0.902 |
| ILIO | 0.845 | 0.903 |
| Exemplary Pytorch/ResNet Implementation | 0.872 | 0.914 |

While these results demonstrate an improvement over conventional techniques, it should be further appreciated that the Pytorch/ResNet implementation was implemented for the challenging online scenario. The Pytorch/ResNet implementation therefore provides additional benefits over conventional offline implementations, including time efficiency and ease of use in real-world applications.

The experimentation further included an ablation study in to analyse the influence of two components of the techniques described herein, namely (a) including feature space data augmentation (FSDA) and (b) incorporating the classifier network output with a prior prediction data vector from a PNN (Prior). An implementation without FSDA and Prior was used as the Baseline and compared with (1) the Baseline+FSDA and (2) the Baseline+FSDA+Prior. The models were evaluated on CIFAR-100 for step size 5, 10 and ImageNet-100 for step size 10. The results demonstrated a large improvement from Baseline to Baseline+FSDA by applying feature space data augmentation, and an even further improvement by incorporating Prior.

As described herein, incremental learning aims to learn new tasks without forgetting the knowledge on old tasks. The techniques described herein can include using a feature extractor and using the extracted features as training inputs, storing feature embeddings in an exemplar set, performing FSDA on the exemplar set, and/or incorporating a prior distribution using a model (e.g., a PNN) to generate the final prediction. While examples described herein are provided in the context of image classification (e.g., where old/new tasks refer to the old/new classes of objects), it should be appreciated that the techniques are not limited to image classification. The techniques can therefore be applied to a broad set of machine learning problems, including those that follow the process of training a deep convolutional neural networks for incremental learning. Indeed, the techniques can be applied to most computer vision problems. For example, the techniques described herein can be used for object detection tasks, image segmentation, etc., which can be achieved by modifying the classifier's output and corresponding loss functions. Further, depending on how the task is specified, the techniques can be used to incrementally learn different tasks (e.g., instead of the classes within each task). It should be further appreciated that while examples are described in the context of input images, the techniques are not restricted to use of images, and therefore it should be appreciated that the input can be any type of data that can be mapped to a feature representation. Therefore, the techniques can further include additional aspects to handle such different types of input data.

Figure 8:
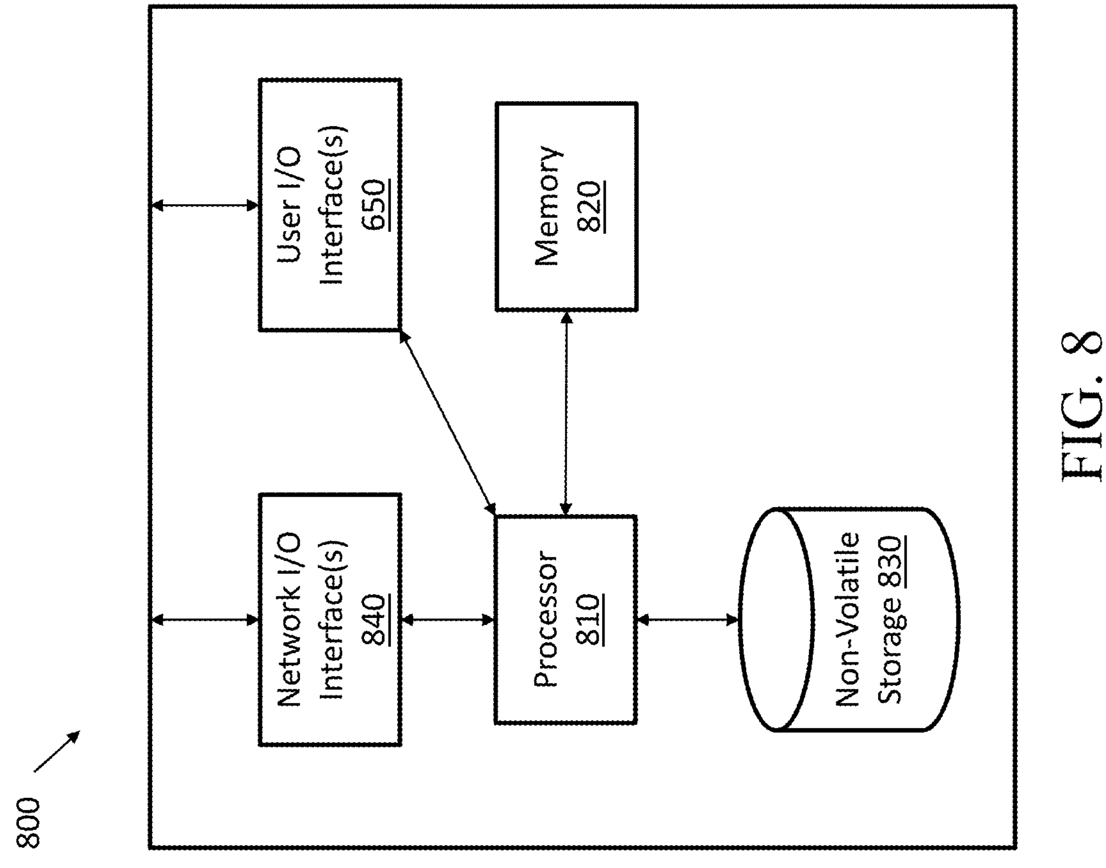
FIG. 8 is an illustrative implementation of a computer system that may be used in connection with any of the embodiments of the technology described herein.

An illustrative implementation of a computer system 800 that may be used in connection with any of the embodiments of the technology described herein (e.g., such as the methods of FIGS. 2, 4 and 6 and/or the architectural components described in conjunction with FIGS. 1, 3, 5 and 7) is shown in FIG. 8. The computer system 800 includes one or more processors 810 and one or more articles of manufacture that comprise non-transitory computer-readable storage media (e.g., memory 820 and one or more non-volatile storage media 830). The processor 810 may control writing data to and reading data from the memory 820 and the non-volatile storage device 830 in any suitable manner, as the aspects of the technology described herein are not limited in this respect. To perform any of the functionality described herein, the processor 810 may execute one or more processor-executable instructions stored in one or more non-transitory computer-readable storage media (e.g., the memory 820), which may serve as non-transitory computer-readable storage media storing processor-executable instructions for execution by the processor 810.

Computing device 800 may also include a network input/output (I/O) interface 840 via which the computing device may communicate with other computing devices (e.g., over a network), and may also include one or more user I/O interfaces 850, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations. Furthermore, the advantages described above are not necessarily the only advantages, and it is not necessarily expected that all of the described advantages will be achieved with every embodiment.

Various aspects are described in this disclosure, which include, but are not limited to, the following aspects:

1. A computerized method for storing a set of representative features for use with a machine learning process, the method comprising: accessing a first set of training images for a class; processing the first set of training images, using a feature extraction technique, to determine a set of features for the class; determining, using a selection technique, a set of representative features from the set of features for the class; storing the set of representative features for the class; accessing a second set of images; and executing, using the stored set of representative features, the machine learning process, comprising executing one or more of: a training phase to train a classifier using the second set of images and at least part of the stored set of representative features; and a testing phase to run the classifier using the second set of images and at least part of the stored set of representative features.
2. The method of 1, wherein determining the set of representative features using the selection technique comprises: determining, based on the set of features, a mean of the features for the class; and determining, based on the mean, the set of representative features, wherein the set of representative features is a subset of the set of features.
3. The method of 1, wherein executing the training phase to train the classifier using the second set of images and at least part of the set of representative features comprises: generating a first modified representative feature for the class, comprising: selecting a first representative feature in the set of representative features for the class; determining a noise component for the first representative feature; and generating, based on the first representative feature and the noise component, the first modified representative feature.
4. The method of 3, further comprising generating a second modified representative feature, comprising: selecting a second representative feature from the set of representative features for the class; and determining the second modified representative feature based on a difference between values of the first representative feature and the second representative feature.
5. The method of 4, wherein the second set of training images comprise a plurality of training images for a second class; and the method further comprises: determining, using the second set of training images, a second set of features for the second class; and executing the training phase to train the classifier comprises training the classifier using: the second set of features; and at least one of the first representative feature, the first modified representative feature, and the second modified representative feature.
6. The method of 5, further comprising: determining a second set of representative features from the second set of features for the second class; and storing the second set of representative features for the second class.
7. The method of 1, wherein the second set of images comprises a new image; and executing the test phase to run the classifier using the new image and at least part of the stored set of representative features comprises: determining a second set of features for the new image; executing, using the second set of features, the classifier to generate a first set of predictions for the new image; executing, using the stored set of representative features, a machine learning model to generate a second set of predictions for the new image; and determining a predicted class for the new image based on the first set of predictions and the second set of predictions.
8. The method of 7, wherein determining the predicted class for the new image comprises: generating, based on the first set of predictions and the second set of predictions, a final set of predictions; and determining the predicted class based on the final set of predictions.
9. The method of 7, wherein executing the machine learning model using the stored set of representative features comprises: accessing a plurality of sets of stored representative features, wherein each set of stored representative features of the plurality is associated with an associated class and an associated step; and executing the machine learning model using the plurality of sets of stored representative features to generate the second set of predictions for the new image.
10. The method of 9, wherein: generating the first set of predictions comprises generating, for each class of the plurality of sets of stored representative features, a first value that is indicative of a prediction of whether the second set of features belongs to the class; and generating the second set of predictions comprises generating, for each step of the plurality of sets of stored representative features, a second value that is indicative of a prediction of whether the second set of features belongs to the step.
11. The method of 8, wherein generating the final set of predictions comprises:
    determining a weighting factor based on (a) a maximum prediction of the second set of predictions and a minimum prediction of the second set of predictions and (b) a normalization constant; adjusting the second set of predictions based on the weighting factor; and adding the first set of predictions to the adjusted second set of predictions.
12. A non-transitory computer-readable media comprising instructions that, when executed by one or more processors on a computing device, are operable to cause the one or more processors to execute the method of any of 1-11.
13. A system comprising a memory storing instructions, and a processor configured to execute the instructions to perform the method of any of 1-11.

What is claimed is:

1. A computerized method for incrementally training a classifier using stored sets of representative features, the method comprising:

accessing a first set of training images for a first class;

processing the first set of training images, using a feature extraction technique, to determine a set of features for the first class;

determining, using a selection technique, a set of representative features from the set of features for the first class, wherein said determination comprises:

determining, based on the set of features, a mean of the features for the first class, and determining, based on the mean, the set of representative features, wherein the set of representative features is a subset of the set of features;

training the classifier using the set of representative features for the first class;

adding the set of representative features for the first class to an exemplar set of representative features for a plurality of classes;

accessing a second set of training images for a second class; and re-training the classifier using the second set of training images and at least part of the exemplar set of representative features.

2. The method of claim 1, wherein re-training the classifier using the second set of training images and at least part of the exemplar set of representative features comprises:

generating a first modified representative feature for the first class, comprising:

selecting a first representative feature in the set of representative features for the first class;

determining a noise component for the first representative feature; and generating, based on the first representative feature and the noise component, the first modified representative feature.

3. The method of claim 2, further comprising generating a second modified representative feature, comprising:

selecting a second representative feature from the set of representative features for the first class; and determining the second modified representative feature based on a difference between values of the first representative feature and the second representative feature.

4. The method of claim 3, wherein the method further comprises:

determining, using the second set of training images, a second set of features for the second class; and re-training the classifier comprises training the classifier using:

the second set of features; and at least one of the first representative feature, the first modified representative feature, and the second modified representative feature.

5. The method of claim 4, further comprising:

determining a second set of representative features from the second set of features for the second class; and adding the second set of representative features for the second class to the exemplar set.

6. The method of claim 1, further comprising executing a testing phase, comprising:

receiving a new image;

determining a new set of features for the new image;

executing, using the new set of features, the classifier to generate a first set of predictions for the new image;

executing, using the exemplar set of representative features, a machine learning model to generate a second set of predictions for the new image; and determining a predicted class for the new image based on the first set of predictions and the second set of predictions.

7. The method of claim 6, wherein determining the predicted class for the new image comprises:

generating, based on the first set of predictions and the second set of predictions, a final set of predictions; and determining the predicted class based on the final set of predictions.

8. The method of claim 6, wherein executing the machine learning model using the exemplar set of representative features comprises:

accessing a plurality of sets of stored representative features in the exemplar set, wherein each set of stored representative features is associated with an associated class and an associated training step in which the classifier was re-trained; and executing the machine learning model using the plurality of sets of stored representative features to generate the second set of predictions for the new image.

9. The method of claim 8, wherein:

generating the first set of predictions comprises generating, for each class of the plurality of sets of stored representative features, a first value that is indicative of a prediction of whether the new set of features belongs to the class; and generating the second set of predictions comprises generating, for each step of the plurality of sets of stored representative features, a second value that is indicative of a prediction of whether the new set of features belongs to the step.

10. The method of claim 7, wherein generating the final set of predictions comprises:

determining a weighting factor based on (a) a maximum prediction of the second set of predictions and a minimum prediction of the second set of predictions and (b) a normalization constant;

adjusting the second set of predictions based on the weighting factor; and adding the first set of predictions to the adjusted second set of predictions.

11. A non-transitory computer-readable media comprising instructions for incrementally training a classifier using stored sets of representative features, wherein the instructions, when executed by one or more processors on a computing device, are operable to cause the one or more processors to:

access a first set of training images for a first class;

process the first set of training images, using a feature extraction technique, to determine a set of features for the first class;

determine, using a selection technique, a set of representative features from the set of features for the first class, wherein said determination comprises:

determining, based on the set of features, a mean of the features for the first class, and determining, based on the mean, the set of representative features, wherein the set of representative features is a subset of the set of features;

train the classifier using the set of representative features for the first class;

add the set of representative features for the first class to an exemplar set of representative features for a plurality of classes;

access a second set of training images for a second class; and re-train the classifier using the second set of training images and at least part of the exemplar set of representative features.

12. The non-transitory computer-readable media of claim 11, wherein the instructions are further operate to cause the one or more processors to:

generate a first modified representative feature for the first class by:

selecting a first representative feature in the set of representative features for the first class;

determining a noise component for the first representative feature; and generating, based on the first representative feature and the noise component, the first modified representative feature.

13. The non-transitory computer-readable media of claim 12, wherein the instructions are further operable to cause the one or more processors to:

generate a second modified representative feature by:

selecting a second representative feature from the set of representative features for the first class; and determining the second modified representative feature based on a difference between values of the first representative feature and the second representative feature.

14. The non-transitory computer-readable media of claim 13, wherein the instructions are further operable to cause the one or more processors to:

determine, using the second set of training images, a second set of features for the second class; and wherein re-training the classifier comprises training the classifier using:

the second set of features; and at least one of the first representative feature, the first modified representative feature, and the second modified representative feature.

15. The non-transitory computer-readable media of claim 14, wherein the instructions are further operable to cause the one or more processors to:

determine a second set of representative features from the second set of features for the second class; and add the second set of representative features for the second class to the exemplar set.

16. The non-transitory computer-readable media of claim 11, wherein the instructions are further operable to cause the one or more processors to execute a testing phase, comprising:

receiving a new image;

determining a new set of features for the new image;

executing, using the new set of features, the classifier to generate a first set of predictions for the new image;

executing, using the exemplar set of representative features, a machine learning model to generate a second set of predictions for the new image; and determining a predicted class for the new image based on the first set of predictions and the second set of predictions.

17. The non-transitory computer-readable media of claim 16, wherein determining the predicted class for the new image comprises:

generating, based on the first set of predictions and the second set of predictions, a final set of predictions; and determining the predicted class based on the final set of predictions.

18. The non-transitory computer-readable media of claim 16, wherein executing the machine learning model using the exemplar set of representative features comprises:

accessing a plurality of sets of stored representative features in the exemplar set, wherein each set of stored representative features is associated with an associated class and an associated training step in which the classifier was re-trained; and executing the machine learning model using the plurality of sets of stored representative features to generate the second set of predictions for the new image.

19. The non-transitory computer-readable media of claim 18, wherein:

generating the first set of predictions comprises generating, for each class of the plurality of sets of stored representative features, a first value that is indicative of a prediction of whether the new set of features belongs to the class; and generating the second set of predictions comprises generating, for each step of the plurality of sets of stored representative features, a second value that is indicative of a prediction of whether the new set of features belongs to the step.

20. The non-transitory computer-readable media of claim 17, wherein generating the final set of predictions comprises:

determining a weighting factor based on (a) a maximum prediction of the second set of predictions and a minimum prediction of the second set of predictions and (b) a normalization constant;

adjusting the second set of predictions based on the weighting factor; and adding the first set of predictions to the adjusted second set of predictions.

* * * * *